(12) United States Patent
Buchholz

(10) Patent No.: US 6,894,883 B2
(45) Date of Patent: May 17, 2005

(54) ENGINE COOLING FAN CONTROL SYSTEM

(75) Inventor: Thomas Buchholz, Stockach (DE)

(73) Assignee: BorgWarner, Inc., Auburn Hills, MI (US)

( * ) Notice: Subject to any disclaimer, the term of this patent is extended or adjusted under 35 U.S.C. 154(b) by 251 days.

(21) Appl. No.: 10/307,112

(22) Filed: Nov. 27, 2002

(65) Prior Publication Data

US 2003/0133242 A1 Jul. 17, 2003

(30) Foreign Application Priority Data

Nov. 30, 2001 (EP) .............................. 01128617

(51) Int. Cl.$^7$ ............................................. H02H 5/04
(52) U.S. Cl. ................... 361/103; 123/41.01
(58) Field of Search ................ 361/103; 307/9.1, 307/10.1, 117, 152; 123/41.01, 41.02, 41.05, 41.49; 310/63, 69, 92; 192/58.4, 58.62, 58.63, 58.64

(56) References Cited

U.S. PATENT DOCUMENTS 5,584,371 A * 12/1996 Kelledes et al. ......... 192/58.61
6,129,193 A * 10/2000 Link ........................ 192/84.1
6,253,716 B1 * 7/2001 Palmer et al. ........... 123/41.12
6,600,249 B2 * 7/2003 Nelson et al. ............... 310/91

* cited by examiner

*Primary Examiner*—Ronald Leja
(74) *Attorney, Agent, or Firm*—Artz & Artz, P.C.; Greg Dziegielewski, Esq.

(57) ABSTRACT

A control system for a fan of a cooling system of an internal combustion engine of a motor vehicle having a viscous coupling (fan clutch) driving the fan and a control unit (PID governor) to which the setpoint temperature and the measured actual temperature of the cooling system (coolant temperature) are fed. The control unit (PID governor) is connected downstream to a limiter, which holds the ratio of output speed to input speed below a specifiable limit (x % of input speed). An overheat protection logic disables the limiter when the actual coolant temperature exceeds a specifiable critical temperature that is higher than the setpoint temperature of the control unit (PID governor).

8 Claims, 2 Drawing Sheets

ENGINE COOLING FAN CONTROL SYSTEM

TECHNICAL FIELD

The present invention relates to a control system for a fan of a cooling system of an internal combustion engine.

BACKGROUND OF THE INVENTION

In a cooling system of an internal combustion engine for motor vehicles having a fan driven by a viscous coupling (fluid coupling), it is known that the temperature of the cooling system may be regulated in that slippage of the coupling is controlled by a control unit. As the need for cooling increases, the degree of engagement of the coupling, i.e., the ratio of output speed to input speed, increases. However, as this ratio increases, i.e., as slippage is reduced, the time that is required in order to pump the viscous fluid out of the chamber of the coupling, and to reduce the degree of engagement of the coupling to a lower required value, increases. This time lag of the viscosity coupling at a high degree of engagement has the disadvantage that the fan continues to run unnecessarily upon a reduction in the engine load. This continued running results, on the one hand, in disadvantageous cooling of the engine and, on the other, in superfluous consumption of energy and fuel.

SUMMARY OF THE INVENTION

An object of the present invention is to procure a control system for the fan of a cooling system of an internal combustion engine that eliminates the above-stated disadvantages and reduces the energy and fuel consumption of the engine.

According to the invention, this object is accomplished by a control system having a viscous coupling (fan clutch) driving the fan and having a control unit (PID governor) to which are fed the setpoint temperature (setpoint of temperature in the cooling system) and the measured actual temperature of the cooling system (coolant temperature). A limiter holds the ratio of output speed to input speed (engagement) of the viscous coupling (tan clutch) below a specifiable limit (x % of input speed), and in that an overheat protection logic controls the viscous coupling (fan clutch) independently of the limiter at the maximum ratio of output speed to input speed (engagement) when the actual temperature of the cooling system (coolant temperature) exceeds a specifiable critical temperature (switchpoint protection logic) that is higher than the setpoint temperature (setpoint for temperature in cooling system).

The invention makes use of the fact that the time lag upon lowering of the speed of the fan is crucial only above a certain value of the ratio of output speed to input speed. Therefore, a limiter is used that holds the ratio of output speed to input speed (engagement) below a specifiable limit, e., below the limit above which the lag time of the fan greatly increases Owing to this slip limitation, cooling is not influenced during general operation of the internal combustion engine, since the required cooling capacity in the average engine performance remains below the value at which the limiter becomes active.

If the engine temperature increases in cases of high engine load, so that the cooling capacity of the fan throttled by slip limitation is no longer sufficient, according to the invention, the overheat protection becomes active, disabling the limiter, so that the engagement of the viscous coupling, i.e., the ratio of output speed to input speed, can rise to above the specified limit of slip limitation. Disadvantageous continued running of the fan with unnecessary consumption of energy and fuel therefore occurs only in the few cases in which high cooling capacity is actually required.

In an advantageous embodiment of the present invention, the fan is controlled by a control unit to which are fed the setpoint temperature of the cooling system on the one hand, and, on the other, the measured actual temperature of the cooling system. This control unit is connected downstream to the limiter, so that the control unit is active in the usual fashion as long as the ratio of output speed to input speed lies below the specifiable limit. If this limit is exceeded, the limiter prevents an additional increase in the ratio of output speed to input speed and thus limits the performance of the fan. In parallel with the control unit of the downstream limiter, the measured actual temperature of the cooling system is fed to the overheat protection, for which there is specified a critical temperature that is higher than the setpoint temperature specified for the control unit, If this critical temperature is exceeded, a priority logic disables control of the fan via the control unit and the fan can be speeded up to its maximum engagement, at which the ratio of output speed to input speed goes toward 100%.

Other embodiments, benefits, and features of the present invention will become apparent from the following description of the invention when viewed in accordance with the accompanying drawings and appended claims.

DESCRIPTION OF THE PREFERRED EMBODIMENT(S)

Figure 1:
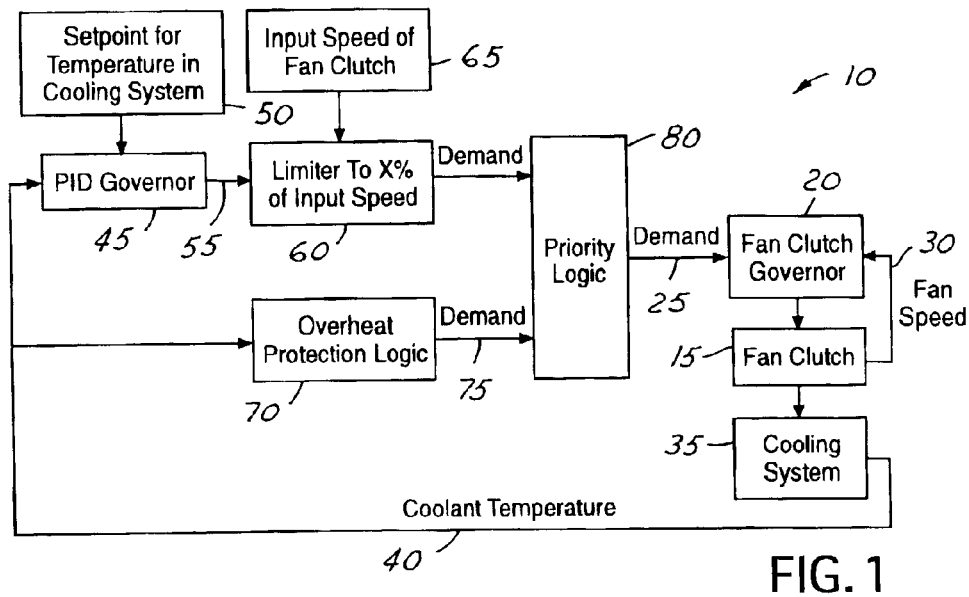
FIG. 1 depicts a block diagram of a control system in accordance with the present invention.

FIG. 1 is a block diagram of a control system for a fan of a cooling system of an internal combustion engine of a motor vehicle in accordance with an embodiment of the present invention. The system is referred to generally by the reference numeral 10. A fan, not represented, is driven via a viscous coupling (fan clutch) 15. The speed of the fan is controlled in an internal rapid control loop via the coupling (fan clutch). A coupling control unit (fan clutch governor) 20, to which a setpoint speed is fed as the desired value (demand) 25, is used for this purpose. The measured fan speed is fed as the actual tan speed 30 value via a control loop to the coupling control unit (fan clutch governor) 20.

The fan acts on the cooling system 35 of the internal combustion engine in order to control the temperature of the coolant. The temperature of the coolant in the cooling system is measured and the temperature measurement (coolant temperature) 40 is fed as the actual value to a control unit, which is designed as a PID governor 45. The setpoint for temperature 50 in the cooling system is fed to this control unit (PID governor). Depending on the deviation, the control unit (PID governor) 45 gives a control signal (demand) 55 as setpoint to the coupling control unit (fan clutch governor) 20.

This control signal (demand) is carried via a limiter (limitation to x % of input speed) 60 connected downstream of the control unit (PID governor) and a priority logic to the coupling control unit (fan clutch governor).

The input speed 65 of the viscosity coupling (fan clutch), which results from the engine speed and optionally a transmission ratio, is fed to the limiter 60.

The limiter limits the setpoint speed fed by the control unit (PID governor) as a correcting variable to the coupling control unit (fan clutch governor) to a specifiable limit of x % of the input speed. As long as the desired input speed supplied by the control unit (PID governor) as the correcting variable is smaller than the specified limit of x % of the input speed, the limiter transmits this desired input speed supplied by the control unit (PID governor) unchanged as the setpoint to the coupling control unit (tan clutch governor) 20. If the input speed supplied by the control unit (PID governor) as the correcting variable increases to above the limit of x % of the input speed, the limiter supplies only this specified limit of x % of the input speed as setpoint speed (demand) to the coupling control unit (fan clutch governor).

The coolant temperature 40 measured in the cooling system is fed in parallel to the control unit (PID governor) 45 and to an overheat protection logic 70. The overheat protection logic compares the measured coolant temperature with a specifiable critical temperature that lies above the setpoint temperature in the cooling system and below the coolant temperature that results in damage to the engine and/or to the cooling system. If the measured coolant temperature exceeds the specified critical temperature, the overheat protection logic supplies a desired input speed value (demand) 75 via the priority logic 80 to the coupling control unit (tan clutch governor) 20 that corresponds to a maximum input speed.

The priority logic supplies the signal of the input speed coming from the control unit (PID governor) via the limiter to the coupling control unit (fan clutch governor) as long as no signal from the overheat protection logic is present. If a signal comes from the overheat protection logic, it is directed by the priority logic to the coupling control unit (fan clutch governor) and the signal coming from the control unit (PID governor) is blocked.

Figure 2:
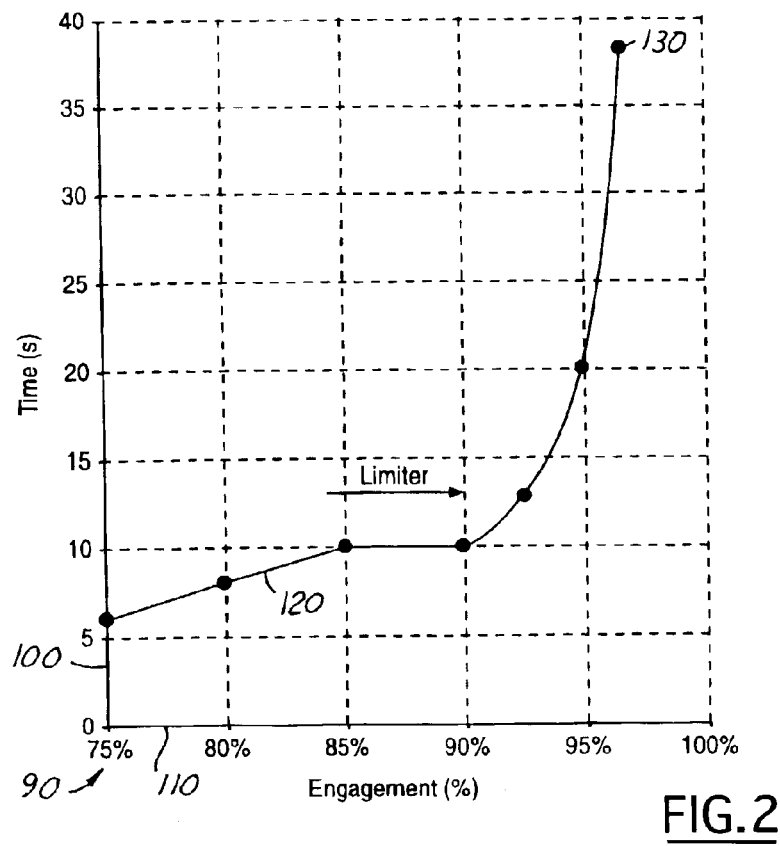
FIG. 2 depicts in graph form the dependence of the lag time of the fan on the ratio of output speed to input speed (engagement)

The operation of the central system 10 is shown diagramically in FIG. 2 and referred to generally by the reference numeral 90. The measured lag time of a fan in seconds 100 is plotted in percent as a function of the ratio of output speed to input speed (engagement) 110. The lag time is the time span over which, after removal of the desired input speed value from the coupling control unit (fan clutch governor), the output speed of the viscous coupling (fan clutch) is reduced to 1/e, i.e., by 63%.

As FIG. 2 shows, as the ratio of output speed to input speed increases from 75% to 90%, the lag time increases only a little from about 6 seconds to 10 seconds (indicated at 120). At a ratio of over 90%, on the other hand, an increasingly steep increase in lag time is found, which, at a ratio of for example 97%, is increased to about 38 seconds (indicated at 130). According to the invention, at such a course of the limiter, a limit (x %) of 90% would be specified, i.e., a limit that still lies below the steep rise in lag time.

Figure 3:
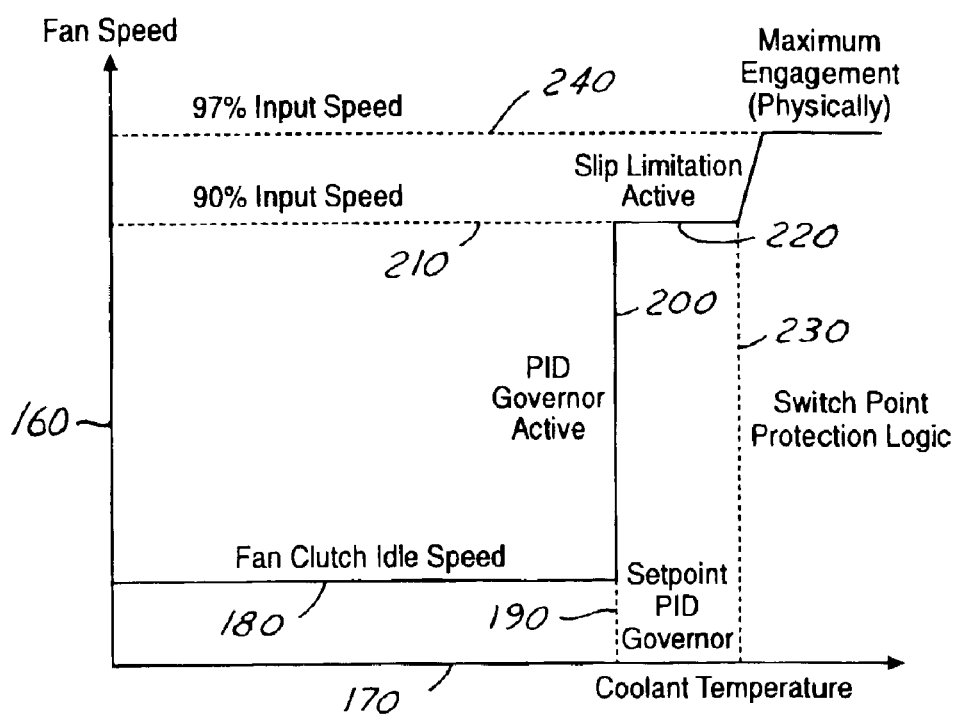
FIG. 3 illustrates in diagramical form the output speed of a fan controlled in accordance with the present invention as a function of the temperature of the cooling system.

The mode of operation of the control system is also shown in the diagram of FIG. 3, and referred to generally by the reference numeral 150. In FIG. 3, the fan speed 160 is plotted as a function of coolant temperature 170. At low coolant temperatures, the fan runs at low constant idling speed (fan clutch at idling speed) 180. As soon as the temperature in the cooling system reaches the setpoint temperature (setpoint of the PID governor) 190, the control unit (PID governor) becomes active 200. The control system holds the coolant temperature constant at the specified setpoint (setpoint for temperature in cooling system) by controlling the output speed of the viscous coupling (fan clutch) and the speed of the fan. In this range, the control means is in the normal operating state of the internal combustion engine, i.e., during most travel operations of the motor vehicle. If greater heating of the coolant takes place under special engine load, a setpoint speed for the coupling control unit (fan clutch governor) that exceeds the specified limit of the limiter of for example 90% of input speed 210 would be required. The slip limitation now becomes active 220 and holds the setpoint speed specified for the coupling control unit (fan clutch governor) at the specified slip limitation limit of, for example, 90%. Since owing to the action of the limiter, the fan speed does not increase, the coolant temperature is able to increase to above the setpoint of the control unit (PID governor).

Thereafter, if the coolant temperature increases to above the critical temperature (switchpoint protection logic) 230 specified to the overheat protection logic, the overheat protection logic specifies via the priority logic to the coupling control unit (tan clutch governor) a desired input speed that preferably lies above the maximum speed. The ratio of output speed to input speed of the viscous coupling assumes the physically maximum possible value, which lies, for example, at 97% of input speed 240. Therefore, the viscous coupling at minimum slip is in maximum engagement, so that the fan provides the maximum possible cooling capacity. If the coolant temperature again drops below the critical overheat protection temperature (switchpoint protection logic), the overheat protection logic gives no output signal and the control unit (PID governor) with the limiter again becomes active after reduction of the fan speed with the time lag.

Owing to the limitation of the ratio of output speed to input speed by means of the limiter, lengthy lag times of the fan and the associated energy loss and fuel consumption in a temperature range below the critical temperature of overheat protection are avoided. The disadvantages of lengthy lag times occur only in exceptional cases at heavy engine load.

While particular embodiments of the invention have been shown and described, numerous variations and alternative embodiments will occur to those skilled in the art. Accordingly, it is intended that the invention be limited only in terms of the appended claims.

What is claimed is:

1. A control system for a fan of a cooling system of an internal combustion engine of a motor vehicle having a viscous coupling driving the fan and having a control unit to which are fed the setpoint temperature in the cooling system and the measured coolant temperature further comprising: a limiter for holding the ratio of output speed to input speed of the viscous coupling below a prespecified value and an overheat protection logic which controls the viscous coupling independently of said limiter at the maximum ratio of output speed to input speed when the actual temperature of the coolant temperature exceeds a prespecified critical temperature that is higher than the setpoint temperature.

2. The control system in accordance with claim 1, in which the control unit is a PID control unit.

3. The control system according to claim 1 in which the limiter is connected downstream of said control unit, the limiter feeds a correcting variable of said control unit as the desired input speed of the viscous coupling when the ratio of output speed to input speed lies below said prespecified value, and the limiter feeds to the viscous coupling a desired input speed, corresponding to a limit specifiable to the viscous coupling, when said limit is exceeded by the viscous coupling.

4. The control system in accordance with claim 1 wherein said coolant temperature is fed in parallel to said control unit and to said overheat protection logic.

5. The control system in accordance with claim 1 wherein control signals of said control unit are supplied by said limiter to said viscous coupling and control signals of said overheat protection logic are supplied to said viscous coupling via a priority logic that blocks said control signals of said control unit by slip limitation when said overheat protection logic delivers said control signals of said overheat protection logic.

6. A method for controlling a cooling system comprising:
   generating a PID governor output as a function of a setpoint temperature;
   limiting said PID governor output in a limiter;
   selecting, through a priority logic, a highest output from said limiter, said limiter comprising an output that may vary between a predefined idle speed and a maximum percentage of an input speed of a fan clutch; and
   selecting, through said priority logic, a highest output from an overheat protection logic, said overheat protection logic being independent of said limiter and comprising a predefined switchpoint whereby said fan clutch is immediately being engaged, whereby said switchpoint is above said setpoint temperature.

7. A control system for a fan cooling system having a fan clutch governor controlling a fan clutch comprising:
   a PID governor generating an output as a function of a setpoint temperature;
   a limiter limiting said PID governor output, said limiter comprising an output that may vary between a predefined idle speed and a maximum percentage of an input speed of the fan clutch;
   an overheat protection logic unit being independent of said limiter and comprising a predefined switchpoint whereby said fan clutch is immediately being engaged, whereby said switchpoint is above said setpoint temperature; and
   a priority logic unit selecting a highest output from said limiter, said priority logic unit further selecting a highest output from said overheat protection logic unit.

8. The system in accordance with claim 7 wherein control signal of said PID governor and control signals of said overheat protection logic unit are supplied to the fan clutch via said priority logic unit, which blocks said control signals of said PID governor by slip limitation when said overheat protection logic delivers said control signals of said overheat protection logic unit.

\* \* \* \* \*